(12) United States Patent
Binsfeld et al.

(10) Patent No.: US 6,533,929 B2
(45) Date of Patent: Mar. 18, 2003

(54) HEATED INCLINED SEPARATION PRESSURE VESSEL

(75) Inventors: Bruce Binsfeld, Lloydminster (CA); Lawrence Duchesne, Lloydminster (CA); Cory Hetherington, Vermillion River (CA); Greg Nuk, Lloydminster (CA); Arlin Smithson, Lloydminster (CA)

(73) Assignee: Corlac Industries (1998) Ltd., Lloydminster (CA)

( * ) Notice: Subject to any disclaimer, the term of this patent is extended or adjusted under 35 U.S.C. 154(b) by 0 days.

(21) Appl. No.: 09/879,435

(22) Filed: Jun. 12, 2001

(65) Prior Publication Data

US 2002/0157997 A1 Oct. 31, 2002

(30) Foreign Application Priority Data

Mar. 7, 2001 (CA) .............................................. 2339590

(51) Int. Cl.⁷ .......................... B01D 17/02; B01D 17/04; C02F 1/40
(52) U.S. Cl. ........................ 210/180; 210/187; 210/539; 210/540
(58) Field of Search ................................ 210/180, 183, 210/188, 252, 259, 261, 513, 521, 536, 539, 187, 540

(56) References Cited

U.S. PATENT DOCUMENTS

| 909,733 A | 1/1909 | Zobler .......................... 210/513 |
| 1,494,670 A | 5/1924 | Delany et al. ............... 210/535 |
| 2,179,137 A | 11/1939 | Stevens et al. ............. 175/366 |
| 2,206,835 A | 7/1940 | Combs .......................... 210/54 |
| 2,375,590 A | 5/1945 | Schonberg et al. ........... 210/51 |
| 2,422,555 A | 6/1947 | Karlson et al. ............... 210/56 |
| 2,613,811 A | 10/1952 | Archibald et al. ........... 210/54 |
| 2,726,729 A | 12/1955 | Willams ...................... 183/2.7 |
| 2,825,422 A | * 3/1958 | Schoenfiled .................. 96/159 |
| 3,425,913 A | 2/1969 | Holden ...................... 196/14.5 |

(List continued on next page.)

FOREIGN PATENT DOCUMENTS

| CA | 197859 | 3/1920 |
| CA | 911369 | 10/1972 |
| CA | 924256 | 4/1973 |
| CA | 926342 | 5/1973 |
| CA | 1035290 | 7/1978 |
| CA | 1042819 | 11/1978 |
| CA | 1237372 | 5/1988 |
| CA | 2041479 | 10/1992 |
| SU | 613769 | 7/1978 |

OTHER PUBLICATIONS

Canadian Patent Application No. 2,108,297, Hesse et al., Filed Oct. 13, 1993.
Canadian Patent Application No. 2,202,210, Komistek et al., Filed Apr. 9, 1997.

*Primary Examiner*—Fred Prince
(74) *Attorney, Agent, or Firm*—Davis & Bujold, P.L.L.C.

(57) ABSTRACT

A heated inclined separation pressure vessel for receiving an oil emulsion. A shell is supported at an oblique angle to horizontal, thereby defining an upper and lower end. An elongated sleeve extends coaxially through the vessel. A heat pipe bundle extends coaxially through the lower vessel end and sleeve, terminating at an intermediate position within the sleeve. A furnace is provided for heating the heat pipe bundle. An inlet, adjacent to the upper end, admits emulsion to the elongated sleeve. Gas liberated from the oil is allowed to flow to the upper end of the sleeve and into a gas separator located above the upper end of the vessel. Emulsified water falls towards the lower end of the sleeve and exits the vessel via a water outlet adjacent to the lower vessel head. An oil outlet, adjacent to the upper vessel head removes clean oil from the pressure vessel.

6 Claims, 3 Drawing Sheets

U.S. PATENT DOCUMENTS

| | | | |
|---|---|---|---|
| 4,115,279 A | 9/1978 | Toft | 210/521 |
| 4,120,796 A | 10/1978 | Huebner | 210/522 |
| 4,132,651 A | 1/1979 | deJong | 210/522 |
| 4,257,895 A | 3/1981 | Murdock | 210/243 |
| 4,604,196 A | 8/1986 | Lowrie et al. | 96/176 |
| 4,919,777 A * | 4/1990 | Bull | 204/563 |
| 4,939,817 A | 7/1990 | Weber | 23/308 S |
| 5,100,531 A | 3/1992 | Stephenson et al. | 208/22 |
| 5,132,011 A | 7/1992 | Ferris | 96/184 |
| 5,143,594 A | 9/1992 | Stephenson et al. | 208/48 AA |
| 5,149,344 A * | 9/1992 | Macy | 210/188 |
| 5,204,000 A | 4/1993 | Steadman et al. | 210/519 |
| 5,240,617 A * | 8/1993 | Hopf | 210/703 |
| 5,326,474 A | 7/1994 | Adams et al. | 210/519 |
| 5,414,776 A | 5/1995 | Sims, Jr. | 381/119 |
| 5,415,776 A | 5/1995 | Homan | 210/519 |
| 5,837,152 A | 11/1998 | Koomistek et al. | 210/801 |
| 5,865,992 A | 2/1999 | Edmondson | 210/180 |
| 6,099,742 A | 8/2000 | Komistek | 210/774 |

* cited by examiner

HEATED INCLINED SEPARATION PRESSURE VESSEL

FIELD OF THE INVENTION

The present invention relates to a high efficiency heated inclined separation pressure vessel used in the separation of oil emulsions.

BACKGROUND OF THE INVENTION

Crude oil is product of an extractions process. Extensive geological and geophysical analysis identifies an oil bearing reservoir within the earth's crust. Reservoir fluids are brought to surface and the components of the reservoir fluids are separated. Oil companies must produce a crude oil product that will be acceptable to the refineries. Most oil bearing reservoirs contain oil, gas, water, and solid particulate. Free water is easily removed from the reservoir effluent using a vessel commonly called a Free Water Knock Out (FWKO). Free gas is easily removed from the reservoir effluent using a vessel commonly called an Inlet Separator. However, some water, gas and solids remain bound up with the crude oil, known as emulsion. These emulsions are usually unacceptable to the refineries and therefore impurities in the oil must be removed. This final polishing process is achieved by various means; heated atmospheric tanks, heated pressure vessels known as emulsion treaters, hydrocyclones and centrifuges.

Once the free water and free gas is removed, the remaining emulsion is an oil continuous phase dispersed with water droplets, gas bubbles and solid particulate. Separation of water, gas and solids from the oil continuous phase is achieved utilizing the difference in densities of the individual components. The general relationship governing this process is expressed in Stoke's Law.

$$V = \frac{d^2(p_c - p_o)}{18\eta_o}g$$

Where: V=settling velocity
d=droplet/bubble/solid diameter of impurity
$p_c$=density of impurity
$p_o$=density of oil continuous phase
η=viscosity of oil continuous phase
g=gravitational acceleration Obviously the factors that influence the separation are: water droplet diameter, solid particulate diameter, gas bubble diameter, density of water, density of solids, density of gas, density of oil, viscosity of oil, heat, settling distance, retention time and the force field the process is subjected to. Chemicals may also enhance the separation efficiency of an emulsion. Once the emulsion is contain within a closed conduit, the volumetric flow rate must remain within the laminar regime.

Heated atmospheric tanks are most commonly used for single well production for various reasons including; minimum capital expenditure and low flow rates. Refinery acceptable crude oil is easily achieved. Atmospheric tanks are limited by throughput (flow rate) and maximum process temperature.

Conventional heated treaters are most commonly used at central processing facilities for various reasons including; greater throughput and higher maximum processing temperatures. Conventional treaters usually fall into two broad categories; horizontal and vertical, each having its own advantages and disadvantages. The most significant disadvantage of conventional treaters is the method of heating. The heat source for conventional treaters has been the fire tube, consisting of a burner outside the vessel, pipe looped inside the vessel and a flue stack outside the vessel. The heat generated from combustion gases transfers to the emulsion by passing the combustion gas through the looped pipe inside the vessel. This heat transfer process is very inefficient due to combustion efficiency of the burner, loss of heat up the flue stack and gunge (consisting of coked hydrocarbon and solid particulate) that builds up on the outside of the fire tube (looped pipe) immediately after start up. A second disadvantage of the conventional treater is the channelling effect. It is well known that fluids will take the path of least resistance. The channel effect is well documented in various SPE papers. The third disadvantage of convention treaters is somewhat of a "catch 22". In the attempt to increase retention time and throughput industry has increased the diameter of the conventional horizontal treaters. Increasing the diameter increases the likelihood of channelling and increases the settling distance. One gains efficiency in retention but losses efficiency with channelling and distance travelled to clearly separate.

Canadian Patent 924256 describes an oblique elongate pressure vessel. The heat source is a fire tube runs coaxially the length of the entire vessel penetrating the pressure vessels upper and lower ends. Canadian Patent 911369 is similar to Canadian patent 924256, except that an electrostatic grid is used as the heat source. Canadian Patent 926342 describes a pressure vessel, generally horizontal, which has both a heat source and an electrostatic grid. U.S. Pat. No. 6,099,742 is similar to Canadian patent 924256, in that it also utilizes a fire tube. In U.S. Pat. No. 6,099,742 the burner is located at the upper end instead of the lower end of the pressure vessel and the flow paths are different. The U.S. Pat. No. 6,099,742 also adds a second vessel for the liberated solution gas. U.S. Pat. No. 5,837,152 (Canadian Patent Application 2202210) describes an oblique elongated pressure vessel.

SUMMARY OF THE INVENTION

What is required is a more efficient configuration of heated inclined separation pressure vessel.

According to the present invention there is provided a heated inclined separation pressure vessel which consists of an oblique elongate pressure vessel. The pressure vessel is closed at both ends with conventional pressure vessel heads, for receiving emulsion where the water, gas and solids are entrained within the continuous oil phase. The present invention incorporates a high efficiency heating transfer assembly, composed of a furnace and heat tubes, to decrease the viscosity of the continuous oil phase, providing a higher settling velocity. The heat tubes penetrate the lower pressure vessel head, run coaxially and concentrically through the vessel, terminated adjacent the upper end of the vessel. Heat transfer to the tubes, for evaporation of the heat tube fluid, is accomplished in the furnace adjacent to lower vessel end.

Although beneficial results may be obtained through use of the heated inclined separation pressure vessel, as described above, it is preferred that an elongated sleeve be positioned coaxially and concentrically through the vessel, enclosing the heat tube bundle. The lower end of the sleeve is open to vessel, while the upper end of the sleeve is closed with conventional pressure vessel heads. The sleeve has several advantages including; providing a chamber for efficient heat transfer from the heat tubes to the emulsion, decreasing the settling distance for impurities. The top half acts as a collector trough for the liberated gas, while guiding the gas to the gas separator. The bottom half acts as a collector trough for the liberated water and solid particulate, while guiding the impurities to the lower end of the vessel for removal.

Although beneficial results may be obtained through use of the heated inclined separation pressure vessel, as described above, it is preferred that a gas separator be located above the vessel adjacent the upper vessel end. The gas separator is defined as an elongated cylindrical pressure vessel, closed at both ends with conventional pressure vessel heads. Gas liberated from the sleeve chamber directed to the gas separator by the trough created by upper surface of the sleeve.

The present invention also includes various mechanical components which will hereinafter be further described including; roller assembly, pivot joint and removable support for timely cost effective maintenance overhauls.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
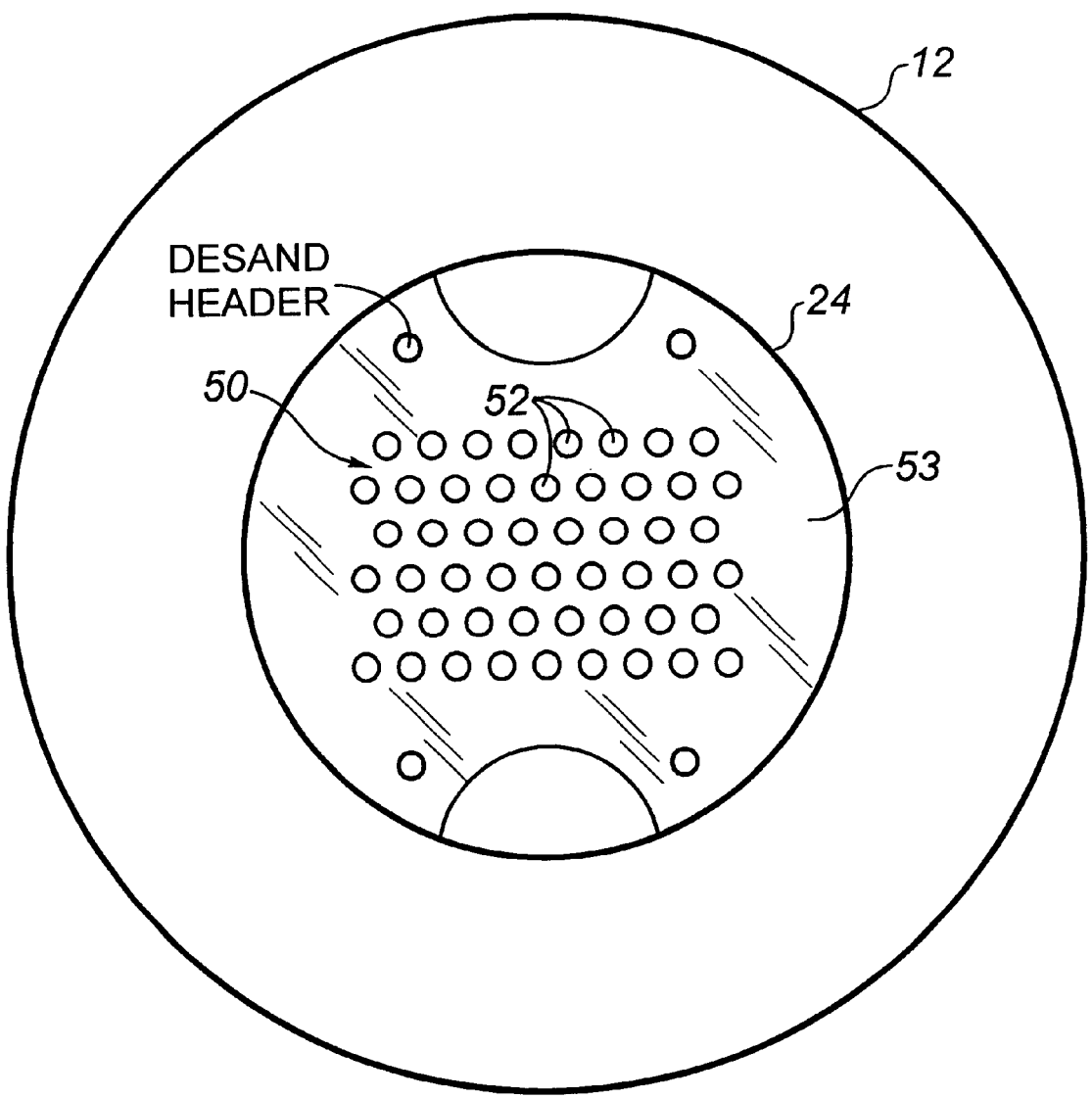
FIG. 2 is an end elevation view, in section, of the heated inclined separation pressure vessel illustrated in FIG. 1.
Figure 3:
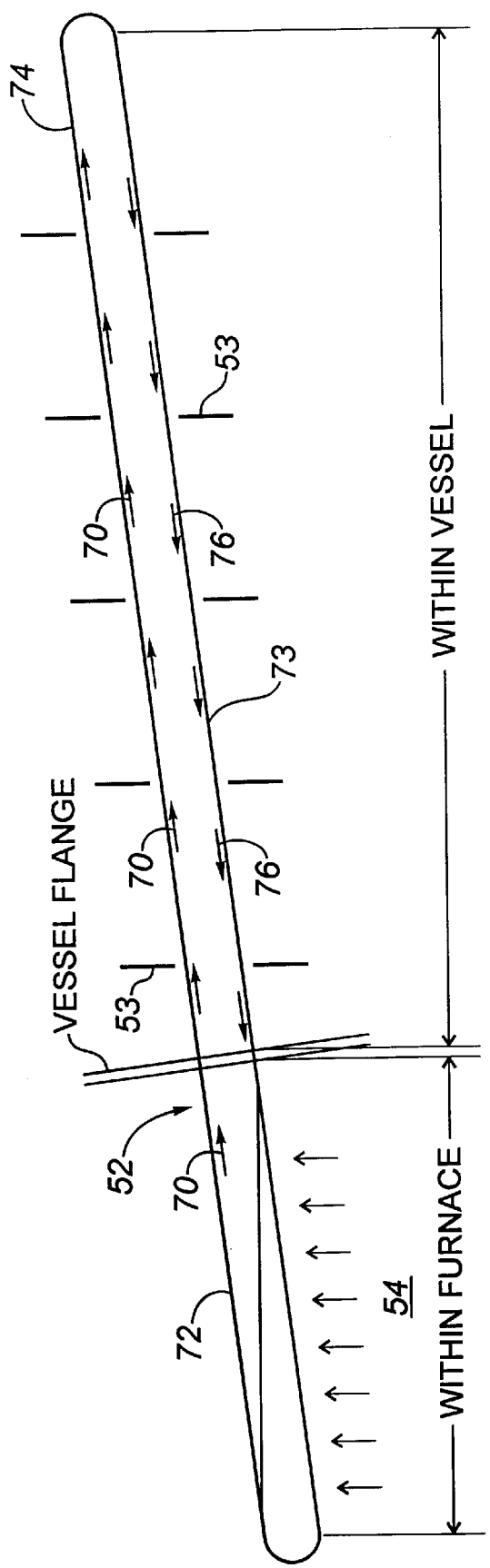
FIG. 3 is a detailed side elevation view, in section, of a single heat tube of the heat tube bundle for the heated inclined separation pressure vessel illustrated in FIG. 1.

The preferred embodiment, a heated inclined separation pressure vessel generally identified by reference numeral 10, will now be described with reference to FIGS. 1 through 3.

Figure 1:
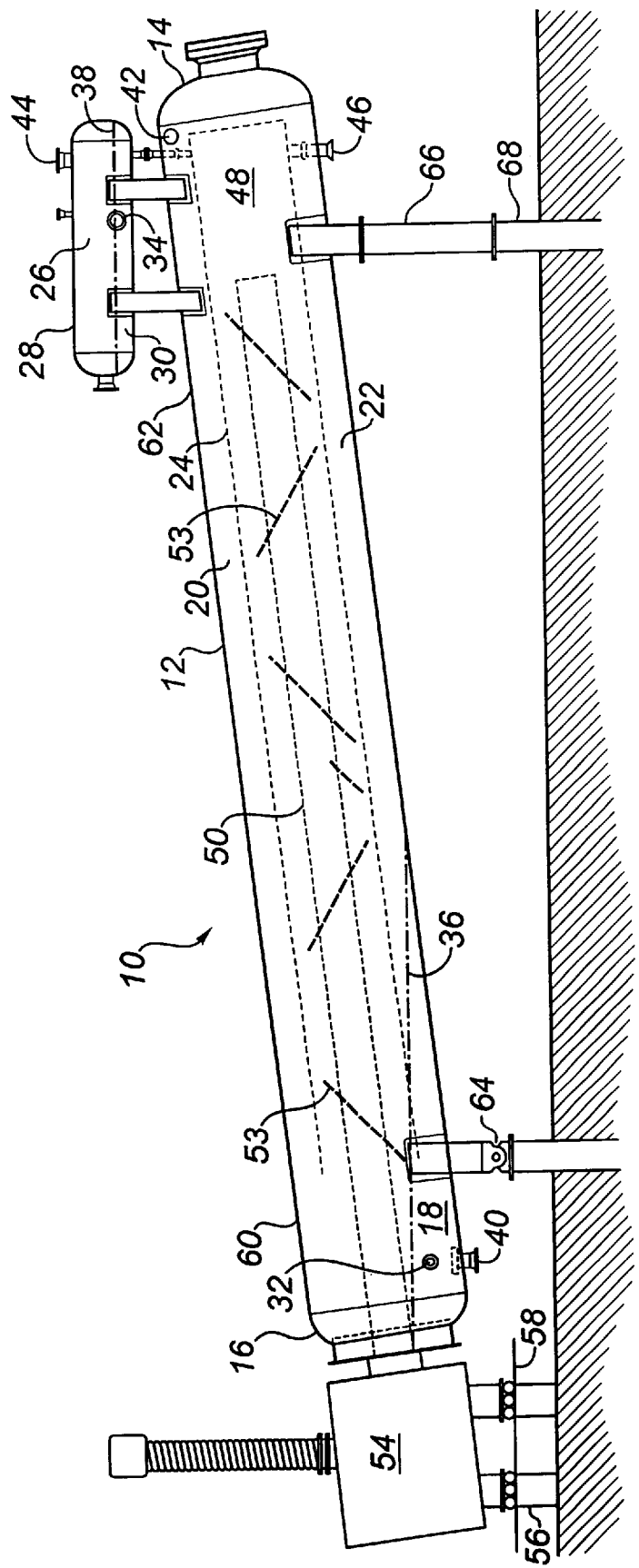
FIG. 1 is a side elevation view, in section, of a heated inclined separation pressure vessel fabricated in accordance with the teachings of the present invention.

Structure and Relationship of Parts:

Referring to FIG. 1, pressure vessel 10 includes an elongated oblique cylindrical shell or tank 12, closed at both ends by conventional pressure vessel heads 14 and 16. Shell 12 provides for a water zone 18 at its lower end, while an oil zone 20 comprises the remaining volume of an annulus 22 between a sleeve 24 and shell 12. Separated gas forms a gas zone 26 which is captured by a gas separator 28, which maintains a fluid level 30.

Pressure vessel 10 includes water and gas level controls 32 and 34 for controlling the levels of the interfaces 36 and 38, respectively. More particularly, the water level controls 32 prevent oil-water interface 36 from rising above a predetermined upper level, and gas level controls 34 prevent gas-liquid interface 38 from falling below a predetermined level. The water level control 32 may consist of, but is not limited to, an interface probe that actuates a control valve downstream of the water outlet 40. The gas level control 34 may consist of, but is not limited to, a level float that actuates a control valve downstream of the oil outlet 42. A back pressure control valve is located downstream of the gas outlet 44, communicating with the gas zone 26 to maintain a constant pressure on pressure vessel 10.

Referring to FIG. 1, a heat tube bundle 50 extends into shell 12 and is positioned within sleeve 24. Referring to FIG. 2, heat tube bundle 50 consists of a plurality of heat tubes 52. Baffles 53 extend between heat tubes in heat tube bundle 50 and sleeve 24 to maintain the straightness of heat tubes 52 and create a tortuous flow path, as will hereinafter be described in relation with operation. The heat source for heat tubes 52 is an external furnace/boiler 54 complete with an internal evaporator reservoir and condensate return line. Referring to FIG. 1, support structure 56 for furnace/boiler 54 is equipped with a locking roller assembly 58. Shell 12 has a first or lower end 60 and a second or upper end 62. At first or lower end 60 shell 12 is supported by a pivot joint 64. At second or upper end 62 shell 12 is supported by a removable support column or spool 66 having an underlying load cell 68.

Operation:

The use and operation of heated inclined separation pressure vessel 10 will now be described with reference to FIG. 1. Emulsion, a continuous crude oil phase dispersed with various impurities including; water, gas and solid particulate, enters the heat transfer chamber 48, defined by the elongated coaxial concentric sleeve 24, though the emulsion inlet 46 which penetrates the shell 12 adjacent the upper vessel end 62 and penetrates the sleeve 24, without communication with the oil zone 20. Water tends to accumulate in water zone 18 at lower end of pressure vessel 10. Oil float on the surface of the water in annulus 22 between a sleeve 24 and shell 12. Separated gas rises and forms a gas zone 26 which is captured by gas separator 28. Referring to FIG. 3, heat is input to water within furnace/boiler 54 causing a phase change of the water to steam. Steam vapour expands and rises up heat tubes 52, as indicated by arrows 70. A first portion 72 of heat tubes 52 serves as an evaporator section in which water turns to steam. A second portion 73 serves as a heat transfer (heat rejection) section in which a heat transfer occurs. A third portion 74 of heat tubes 52 serves as a condensation section, where the steam condenses back to water. The liquid water droplets then flow along the incline of heat tubes 52 back into furnace/boiler 54 as indicated by arrows 76. Referring to FIG. 1, the heat transfer coefficient between the steam within the heat tubes 52 and oil flowing outside of heat tubes 52 is enhanced by integrating a plurality of baffles 53 within heat tube bundle 50 around heat tubes 52 to increase the effect of forced convection guiding the fluid through the most torturous path possible through sleeve portion 24 of shell 12. During use sand and particulate accumulates will inevitably accumulate within shell 12. Such accumulations cause the weight of shell 12 to increase. Load cell 68 is set to provide a warning when cleaning is required and is preferably integrated into an automatic desand system. When repairs are required, shell 12 has been designed to facilitate servicing. Should furnace/boiler 54 malfunction, support structure 56 for furnace/boiler 54 is equipped with locking roller assembly 58. The lock on roller assembly 58 is released and furnace/boiler 54 is roller off support structure 56, with another furnace/boiler 54 being rapidly substituted. If shell 12 must be removed, removable support column 66 is removed to enable second or upper end 62 to be lowered. The lowering of shell 12 is facilitated by pivot joint 64. From the lowered position, shell 12 can be either inspected, serviced or replaced.

MAIN ASSEMBLY AND GENERAL GEOMETRY

Technical Achievements;
1) High L/d Ratio
2) High A/V Ratio

3) Slug Control
4) Decrease in slop generation
5) Lower manufacturing costs due to small diameter
6) Lower transportation costs due to small diameter The main vessel, sleeve and heat pipe inclination with respect to the horizontal provides high efficient separation characteristics. The inclination creates a virtual interface much higher then conventional horizontal heated separation pressure vessel, therefore decreasing the average settling distance. The inclination also reduces the size of the actual interface between the oil and water, therefore decreasing the area for slop oil generation. The sleeve located coaxial with in the elongated cylindrical shell enhances the separation efficiency further, utilizing the annulus as the main separation zone further reducing the settling distance. The sleeve also forces the emulsion to make two complete passes through, thereby providing more time for the smaller diameter droplets/particles to settle out. These, improvements are manifest within two geometric ratios. One is the length to diameter ratio (L/d) and the other is the separation surface area to total volume ratio (AssVt). Both the L/d and the A/V are approximately four times greater than conventional horizontal heated separation pressure vessel of equivalent volumetric throughput. The addition of the gas separator increases retention time of liquids as volume within elongated cylindrical shell is not occupied by gas. Gas separator also provides an excellent means of gas slug control.

HEAT SOURCE ASSEMBLY

Technical Achievements;

1) No 'hot spot', therefore reduced koching
2) Constant temperature of entire surface equals higher heat transfer coefficient
3) Increased surface area of bundle equals higher heat transfer coefficient
4) High pressure, high insulation furnace results in reduced fuel gas consumption
5) Reduced fuel gas consumption equals reduced emissions
6) Need for angle eases integration
7) Reduces the number of challenging joints from four to one
8) Extend physical limitations associated with U-Tube
9) Increase in force convection with baffling
10) Increase safety due to separation of heat source and flammable fluids Heat is required to maximize the settling velocity as defined by Stoke's Law. As the temperature of the emulsion increases, the viscosity and density of the oil decreases and therefore the settling velocity of containments throughout the oil is increased. The normal heat source for all heated separation pressure vessels is the natural gas fired burner tube. Consisting of a single high temperature heat source and single U-tube and stack. Fuel gas is burned at a high ratio of gas to air, increasing required minimum fuel gas consumption for efficient heat transfer. A hot spot is created on the fire tube at the heat source and large temperature gradient exists throughout the length of the fire tube, decreasing the ability for efficient heat transfer and therefore increased fuel gas consumption. Also, the build up of a koching solids around the fire tube hot spot decreases the heat transfer coefficient. The fire tube is usually located in a vertical or quasi-horizontal position allowing for natural flow of hot combustion gases. The intake and exhaust of the U-Tube fire tube penetrate the pressure vessel head or shell adjacent each other. These conventional configurations of fire tube assemblies presented physical limitations on size. These limitations on size were overcome in prior art CA 924,256 and U.S. Pat. No. 6,099,742 with the straight through fire tube. However, the straight through fire tube presents its own thermal limitations, theoretically overcome by each prior art in their own specific designs. CA 924.256 provides a packing gland style joint for penetration of lower pressure vessel head by fire tube intake and an expansion style joint for penetration of upper vessel head by fire tube exhaust. U.S. Pat. No. 6,099,742 has designed around the thermal limitations of the straight through fire tube with expansion style joints at both ends. Interestingly, U.S. Pat. No. 6,099,742 has reversed the flow of combustion gases (going against natural convection) and added a blower to assist with flow.

The heat tube technology incorporated into separation pressure vessel 10 overcomes all of the above limitations with the fire tube, both U-Tube and straight, while reducing the amount of emissions released during heat energy generation. The heat tube heat source is the most efficient heat transfer assembly for several reasons; constant temperature of entire length of tube, increase surface area of multi-tube bundle and high efficiency (well insolated) natural gas furnace reduces fuel gas consumption. In addition, heat tubes work best when located at an oblique angle to horizon easing the integration of heat assembly and main vessel assembly. In fact, both the angles of the main vessel assembly and heat assembly can be set to match each other exactly. A third advantage of the heat tube technology is lack of penetration of upper sleeve and upper vessel head end and ease of penetration of the lower sleeve end. This advantage eliminates the need for expansion type and packing gland type joints as required by CA 924,256 and U.S. Pat. No. 6,099,742. Separation pressure vessel 10 also increases the heat transfer coefficient by integrating a plurality of baffles within and around the heat tube bundle to increase the effect of forced convection guiding the fluid through the most torturous path possible through the sleeve portion of the vessel. (See Baffle Assembly for more detail).

DESAND ASSEMBLY

Technical Achievements;

1) Minimum disturbance
2) Maximum coverage
3) Desand Indicator

Conventional horizontal heated pressure vessels have designed their systems based on a primitive desand philosophy, hoping all the sand falls to the bottom of the vessel where a high pressure, and therefore highly disruptive, water jetting system attempts to push the sand to outlet nozzles. The sand that does not settle to the bottom of the vessel is left to accumulate within the vessel for a year or two until the next turn around. The frequency of the desanding operation is determined in theory off unreliable pro-rated production data which ultimately leads to trial and error. Separation pressure vessel 10 overcomes all of the above.

Inclination of separation pressure vessel 10 increases the ability of desanding with minimum disturbance. Coupled with a high volume water injection system, the sand bed that accumulates along the trough of the sleeve and with in the tube bundle gently fluidizes and flows downhill to the sand outlet. The high volume water injection is placed liberally throughout the heat tube bundle and trough area of the sleeve. Solid contaminates are usually bound up in the viscous low temperature oil emulsion, as the temperature rises smaller and smaller particulate is liberated from the oil. Solid particulate is potentially found everywhere with in the sleeve. A load cell is placed within the structural frame of separation pressure vessel 10. As sand and particulate accumulates in the vessel the weight of the vessel increases proportionately. The load cell can be set to provide an indicator light or integrated into an automatic desand system.

BAFFLE ASSEMBLY

Technical Achievements;

1) Most torturous path for maximum heat transfer coefficient
2) Maintain straightness of heat pipes
3) Provide for flow of liberated gas
4) Provide for flow of fluidized particles
5) Preferential heating of oil Baffles have been a common feature of most separation pressure vessel for some time now. Separation pressure vessel 10 has a specific baffle assembly providing one primary function and several auxiliary functions. The baffle assembly has been coupled with the heat tube bundle to ensure straightness of elongated heat tubes and to work as a guide to ease assembly when inserting tube bundle within the sleeve. The baffles contain an elliptical type opening in both the top and bottom. The baffles guide the emulsion through a torturous path while providing a means at the top for liberated gas to escape to the gas separator and a means at the bottom for liberated water and fluidized particulate to escape to the lower pressure vessel end. The size of the elliptical type openings will depend of the flow rate of individual components. The baffle assembly and heat tube bundle are coupled to preferentially heat the oil in the emulsion verse the water. Upon sleeve inlet the water is immediately directed to the trough of the sleeve.

STRUCTURAL ASSEMBLY

Technical Achievements;

1) Facilitate expedient turnaround
2) Eliminate welding during installation
3) Detect amount of solid particulate The structural frame assembly on conventional horizontal and vertical pressure vessels is typically only designed for stationary structural support. Little to no attention is paid to the difficulties with turn around and installation. To increase the ease of turnaround the furnace support structure has been equipped with a roller assembly and locking device. The lower pressure vessel end is supported by a pivot joint and the upper pressure vessel end is supported by a removable spool and load cell.

GAS SEPARATOR ASSEMBLY

Technical Achievements;

1) Reduce affect of gas slugs
2) Immediate liberation of free gas
3) Maximize gas liberation
4) Integration with inclined heated pressure vessel
5) Reliable level control
6) Reduced foaming Separating and effectively overcoming the challenges of any amount of gas from slightly entrained to severe slugging. Separator pressure vessel 10 is able to meet these challenges. The gas separator is a pressure vessel located above the upper pressure vessel head end where the gas naturally accumulates. The size of the gas separator will be optimally selected to reflect the particular slugging profile. In order to reduce the effect of gas slugging the inlet has be located in the head of the gas separator, eliminating the agitation effect of gas flowing through liquid. The inlet is also equipped with cyclone degasser, instantly liberating gas via centrifugal force. The cyclone degasser combined with the accurately sized volume container effectively eliminates adverse affects of gas slugging. Gas accumulated within the annulus between the elongated cylindrical shell and internal sleeve is released to gas separator via an entrained gas loop. This feature allows for all gas to escape to the gas separator. The gas separator also provides and effective reliable means for level control. With the foaming challenge overcome, a simple float level controller will easily and reliable maintain level control while approaching a steady state operation.

NOZZLE LOCATIONS

Technical Achievements;

1) Wet in gas separator
2) Water Outlet in cleanest water
3) Oil outlet in cleanest oil
4) Separate Sand Outlet
5) Optional inlet for sand service Pressure vessels have been equipped with nozzle since the first vessel was fabricated. The location and internal characteristics of separation pressure vessel 10 make its nozzles unique. The inlet nozzle is in the head of the gas separator verses the main pressure vessel as in most prior art. The inlet nozzle is also equipped with a cyclone degasser. The oil and water outlet contain risers terminating in the cleanest oil and water. As an option, for applications where sand is encountered, an alternative inlet nozzle is offered c/w inlet deflector baffle. This option minimizes and even eliminates the sand carry over to the gas separator.

LOWER END HEAD ASSEMBLY

Technical Achievements;

1) Maintain ASME Code Specifications
2) Provide for penetration of heat tube bundle
3) Provide for penetration of desand inlet piping
4) Provide for removal of sleeve The greatest challenge in conventional pressure vessel head design is provide a throat for penetration of U-Tube fire tube. The design of the lower pressure vessel head presented a challenge for exceeding any fire tube penetration. The lower pressure vessel head had to allow for penetration of heat tubes, desand water piping, removal of internal sleeve and still remain safe enough to meet or accede AMSE Section VIII Certification. The challenges above were overcome with a standard 2:1 elliptical head customized for several functions. First, a circular man-way type opening was fabricated at the center of the head. The flange designed to mate with the opening contained several threaded holes provide for the tube bundle and desand water piping. The throat side of the elliptical head was equipped with RFSO Flange. The mating flange was installed on the elongated cylindrical shell. This flange provided the means to completely open the lower pressure vessel end to facilitate removal of the internal sleeve.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A heated inclined separation pressure vessel, comprising:
    a shell having a longitudinal axis for receiving oil in which water is emulsified, gas is entrained and solid particulate is present, for the purpose of separating the water, gas and solid particulate from the oil;
    means for supporting said shell such that the axis is at an oblique angle to the horizontal, whereby the shell has an upper and a lower end;
    a lower head closing the lower end;
    an upper head closing the upper end;
    an elongated sleeve extending coaxially into the shell, the sleeve being closed at the upper end with a head and having an open lower end located at an intermediate position between the ends of the shell;
    an emulsion nozzle adjacent to the upper end for admitting emulsion to the elongated sleeve;
    a water nozzle adjacent to the lower end to purge water from the shell;
    a gas nozzle adjacent to the upper end to remove gas from the oil;
    an oil nozzle adjacent to the upper end to remove clean oil from the shell;
    a heat source comprising:
        an elongated heat tube bundle extending coaxially through the sleeve, the heat tube bundle having a plurality of heat tubes, the bundle having a lower end and an upper end, the lower end being an evaporator section and the upper end being a condenser section;
        a furnace wherein heat pipe fluids are evaporated.

2. The heated inclined separation pressure vessel as defined in claim 1, wherein a gas separator is located above the upper end of the shell and is in fluid communication with substantially the highest location within the elongated sleeve.

3. The heated inclined separation pressure vessel as defined in claim 1, wherein the shell and sleeve are substantially cylindrical and coaxial.

4. The heated inclined separation pressure vessel as defined in claim 1, wherein the furnace is supported by a roller assembly.

5. The heated inclined separation pressure vessel as defined in claim 1, wherein the shell is supported by a pivot joint and removable column support.

6. The heated inclined separation pressure vessel as defined in claim 1, wherein baffles extend between the heat tubes of the bundle and the sleeve, the baffles supporting the heat tubes and defining a tortuous flow path for fluids being separated.

* * * * *